United States Patent
Wu et al.

(10) Patent No.: US 11,846,085 B2
(45) Date of Patent: Dec. 19, 2023

(54) ENERGY MANAGEMENT SYSTEM FOR A HYBRID VEHICLE WITH AN ELECTRICALLY POWERED HYDRAULIC SYSTEM

(71) Applicant: Deere & Company, Moline, IL (US)

(72) Inventors: Long Wu, Fargo, ND (US); Eric Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 749 days.

(21) Appl. No.: 16/946,685

(22) Filed: Jul. 1, 2020

(65) Prior Publication Data
US 2021/0254696 A1 Aug. 19, 2021

Related U.S. Application Data

(60) Provisional application No. 62/977,611, filed on Feb. 17, 2020.

(51) Int. Cl.
  *E02F 9/20* (2006.01)
  *E02F 9/22* (2006.01)
(52) U.S. Cl.
  CPC .......... *E02F 9/2075* (2013.01); *E02F 9/2246* (2013.01)
(58) Field of Classification Search
  CPC ....... E02F 9/2075; E02F 9/2246; E02F 9/202; E02F 9/2091
  See application file for complete search history.

(56) References Cited

U.S. PATENT DOCUMENTS

| | | |
|---|---|---|
| 3,214,987 A | 11/1965 | Schenck et al. |
| 3,626,787 A | 12/1971 | Singer |
| 3,651,904 A | 3/1972 | Snoy et al. |
| 3,714,845 A | 2/1973 | Mooney, Jr. |
| 3,783,711 A | 1/1974 | Orshansky, Jr. |
| 4,090,414 A | 5/1978 | White |

(Continued)

FOREIGN PATENT DOCUMENTS

| | | |
|---|---|---|
| CN | 101255907 A | 9/2008 |
| CN | 102844588 A | 12/2012 |

(Continued)

OTHER PUBLICATIONS

German Search Report issued in application No. DE102021209495.3 with translation, dated Jan. 11, 2022 (24 pages).

(Continued)

*Primary Examiner* — Abiy Teka
(74) *Attorney, Agent, or Firm* — KLINTWORTH & ROZENBLAT IP LLP (57) ABSTRACT

A hydraulic pump supplies hydraulic energy to a hydraulic system load. A vehicle controller establishes a commanded rotor speed for the motor or electric machine based on a target pump rotational speed of a pump rotor or pump shaft for operation of the hydraulic pump at a set point or within an operational region consistent with the hydraulic system load or estimated work task of the vehicle for one or more sampling intervals, where the set point or operational region is defined by a hydraulic pump flow rate versus head characterization curve and where the target pump rotational speed can be independent of a rotational speed of the engine shaft (e.g., in a first mode).

17 Claims, 6 Drawing Sheets

(56) References Cited

U.S. PATENT DOCUMENTS

| | | |
|---|---|---|
| 4,164,155 A | 8/1979 | Reed et al. |
| 4,164,156 A | 8/1979 | Reed |
| 5,156,577 A | 10/1992 | Fredriksen et al. |
| 5,277,286 A | 1/1994 | Yamamoto et al. |
| 5,353,662 A | 10/1994 | Vaughters |
| 5,508,574 A | 4/1996 | Vlock |
| 5,611,245 A | 3/1997 | McKee |
| 5,931,757 A | 8/1999 | Schmidt |
| 6,394,925 B1 | 5/2002 | Wontner et al. |
| 6,478,705 B1 | 11/2002 | Holmes et al. |
| 6,641,505 B2 | 11/2003 | Sayman et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan |
| 7,479,081 B2 | 1/2009 | Holmes |
| 7,491,144 B2 | 2/2009 | Conlon |
| 7,611,433 B2 | 11/2009 | Forsyth |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,439,787 B2 | 5/2013 | Salamandra et al. |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,672,069 B2 | 3/2014 | Cherney et al. |
| 8,734,281 B2 | 5/2014 | Ai et al. |
| 8,747,266 B2 | 6/2014 | Aitzetmueller |
| 8,784,246 B2 | 7/2014 | Freichel |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow |
| 9,487,073 B2 | 11/2016 | Love |
| 9,562,592 B2 | 2/2017 | Rekow et al. |
| 9,840,165 B2 | 12/2017 | Cox |
| 9,840,827 B2 | 12/2017 | Miyamoto et al. |
| 9,944,163 B2 | 4/2018 | McKinzie |
| 10,029,694 B2 | 7/2018 | Sharp et al. |
| 9,981,665 B2 | 11/2018 | Rekow et al. |
| 10,119,598 B2 | 11/2018 | Rekow et al. |
| 11,091,018 B2 | 8/2021 | Ore et al. |
| 11,137,052 B2 | 10/2021 | Ore et al. |
| 11,413,960 B2 | 8/2022 | Bindl et al. |
| 11,535,234 B2 | 12/2022 | Duffy et al. |
| 11,572,672 B2 | 2/2023 | Vilar et al. |
| 2001/0016536 A1 | 8/2001 | Minowa et al. |
| 2003/0186769 A1 | 10/2003 | Ai et al. |
| 2004/0094381 A1 | 5/2004 | Versteyhe |
| 2004/0172184 A1 | 9/2004 | Vukovich et al. |
| 2005/0036894 A1 | 2/2005 | Oguri |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0171626 A1 | 7/2008 | Pollman |
| 2009/0250278 A1 | 10/2009 | Kawasaki et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller |
| 2013/0023370 A1 | 1/2013 | Grad et al. |
| 2013/0123055 A1 | 5/2013 | Mattsson et al. |
| 2013/0173126 A1 | 7/2013 | Ruebsam |
| 2013/0211655 A1 | 8/2013 | Ogata et al. |
| 2013/0231815 A1 | 9/2013 | Tanishima et al. |
| 2013/0325238 A1 | 12/2013 | Kato et al. |
| 2014/0018201 A1 | 1/2014 | Tolksdorf |
| 2014/0128196 A1 | 5/2014 | Rintoo |
| 2014/0128217 A1 | 5/2014 | Tabata et al. |
| 2014/0248986 A1 | 9/2014 | Weeramantry et al. |
| 2014/0315685 A1 | 10/2014 | Hofler |
| 2015/0006007 A1 | 1/2015 | Kitahata |
| 2015/0072823 A1 | 3/2015 | Rintoo |
| 2015/0142232 A1 | 5/2015 | Tabata et al. |
| 2015/0142282 A1 | 5/2015 | Lee et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1* | 9/2016 | Watanabe .............. F16H 3/62 |
| 2017/0102059 A1* | 4/2017 | Rekow .................. B60K 6/365 |
| 2017/0129477 A1 | 5/2017 | Ideshio et al. |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1 | 3/2018 | Endo et al. |
| 2018/0149247 A1 | 5/2018 | Rekow et al. |
| 2018/0298993 A1 | 10/2018 | Fliearman et al. |
| 2018/0347416 A1* | 12/2018 | Komori .................. F01M 1/02 |
| 2019/0111773 A1* | 4/2019 | Nishikawa ............ E02F 9/2285 |
| 2019/0118642 A1 | 4/2019 | Cho et al. |
| 2019/0344654 A1 | 11/2019 | Kaltenbach et al. |
| 2019/0389298 A1 | 12/2019 | Kaltenbach et al. |

FOREIGN PATENT DOCUMENTS

| | | |
|---|---|---|
| DE | 1173348 B | 7/1964 |
| DE | 1010919 A1 | 10/1991 |
| DE | 4131572 A1 | 3/1993 |
| DE | 19621200 A1 | 11/1997 |
| DE | 19954636 A1 | 5/2001 |
| DE | 10128076 A1 | 12/2002 |
| DE | 10319252 A1 | 11/2004 |
| DE | 112006002537 T5 | 9/2008 |
| DE | 202009007972 U1 | 6/2010 |
| DE | 11545 U1 | 12/2010 |
| DE | 102010026460 A1 | 3/2011 |
| DE | 102012216781 A1 | 3/2011 |
| DE | 102008032320 A1 | 6/2011 |
| DE | 102010021846 A1 | 12/2011 |
| DE | 10201102210 A1 | 7/2012 |
| DE | 102011102184 A1 | 7/2012 |
| DE | 10201105868 A1 | 1/2013 |
| DE | 102011115002 A1 | 4/2013 |
| DE | 102013200158 A1 | 7/2014 |
| DE | 102013009649 A1 | 12/2014 |
| DE | 102013220167 A1 | 4/2015 |
| DE | 202015102282 U1 | 6/2015 |
| DE | 102014225298 A1 | 7/2015 |
| DE | 102015111119 A1 | 1/2016 |
| DE | 102015215461 A1 | 2/2016 |
| DE | 102015220635 A1 | 5/2016 |
| DE | 201500200973 A1 | 7/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102006041160 A1 | 9/2018 |
| DE | 102008030521 A1 | 9/2018 |
| DE | 102018108510 A1 | 10/2018 |

(56) References Cited

FOREIGN PATENT DOCUMENTS

| | | |
|---|---|---|
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020213675 A1 | 5/2021 |
| DE | 102020215219 A1 | 6/2021 |
| EP | 00805059 A2 | 5/1997 |
| EP | 01099882 A2 | 5/2001 |
| EP | 1707416 B1 | 8/2007 |
| EP | 02466168 | 6/2012 |
| EP | 02466169 | 6/2012 |
| EP | 2631144 B1 | 8/2013 |
| EP | 2682531 A1 | 1/2014 |
| EP | 2832567 A1 | 2/2015 |
| EP | 2855226 B1 | 9/2018 |
| JP | 6462174 B1 | 1/2019 |
| WO | WO2007017975 A1 | 2/2007 |
| WO | 2008019799 A2 | 2/2008 |
| WO | 2011092643 A1 | 8/2011 |
| WO | 2012171812 | 12/2012 |
| WO | 2017107848 A1 | 6/2017 |
| WO | 2021115580 A1 | 6/2021 |

OTHER PUBLICATIONS

German Search Report issued in counterpart application No. 102020209003.3 dated Apr. 15, 2021 (10 pages).

USPTO, Non-Final Office Action issued in U.S. Appl. No. 16/555,913 dated Jan. 4, 2021.

USPTO, Non-Final Office Action issued in U.S. Appl. No. 17/559,496 dated Aug. 31, 2022.

USPTO, Non-Final Office Action issued in U.S. Appl. No. 17/538,691 dated Sep. 15, 2022.

USPTO, Final Office Action issued in U.S. Appl. No. 16/555,913 dated Apr. 20, 2021.

German Search Report issued in counterpart application No. 102020209003.3 dated Jul. 17, 2021 (10 pages).

German Search Report issued in application No. DE102021212506.9 with translation, dated Jun. 20, 2022. (24 pages).

German Search Report issued in application No. DE102022210460.9 with translation, dated May 8, 2023. (29 pages).

USPTO, Non-Final Office Action issued in U.S. Appl. No. 17/066,746 dated Oct. 26, 2021.

German Search Report issued in counterpart application No. 102017220666.7 dated May 28, 2021 (10 pages).

German Search Report issued in application No. DE102021214746.1 with translation, dated Jun. 30, 2022. (25 pages).

USPTO, Non-Final Office Action issued in U.S. Appl. No. 17/154,729 dated Jul. 15, 2022. (7 pages).

German Search Report for German application No. 102020202651.3 dated Sep. 1, 2020.

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.

Luscious Garage Hybrid Specialists, Gen 1 Prius Transmission Repair, P3009, P3120, P3125, https://lusciousgarage.com/blog/gen_1_prius_transmission_repair_p3009_p3120_p3125/ dated Oct. 28, 2008.

John M. Miller, Hybrid Electric Vehicle Propulsion System Architectures of the e-CVT Type, IEEE Transactions on Power Electronics, vol. 21, No. 3, May 2006.

Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.

USPTO, Office Action in U.S. Appl. No. 14/249,258 dated Apr. 21, 2017.

USPTO, Final Office Action in U.S. Appl. No. 15/971,867 dated Jun. 24, 2020.

USPTO, Office Action in U.S. Appl. No. 14/249,258 dated Aug. 22, 2017.

USPTO, Office Action in U.S. Appl. No. 14/249,258 dated Oct. 17, 2016.

USPTO, Office Action in U.S. Appl. No. 15/485,911 dated Feb. 8, 2019.

USPTO, Office Action in U.S. Appl. No. 15/879,796 dated Aug. 23, 2019.

USPTO, Office Action in pending U.S. Appl. No. 15/971,867 dated Dec. 12, 2019.

USPTO, Office Action in U.S. Appl. No. 15/664,289 dated Jul. 26, 2018.

USPTO, Office Action in U.S. Appl. No. 14/536,097 dated Sep. 25, 2017.

USPTO, Office Action in U.S. Appl. No. 15/628,979 dated Nov. 5, 2019.

USPTO, Office Action in U.S. Appl. No. 15/664,289 dated Dec. 13, 2018.

USPTO, Office Action in U.S. Appl. No. 15/793,522 dated Apr. 18, 2019.

CNIPA Office Action for Application No. 201510165982.4 dated Aug. 9, 2018, Serial Notice No. 2018080601675890.

German Search Report for application No. 10215206174 dated Jul. 16, 2015.

German Search Report for application No. 1020182036705 dated Dec. 20, 2018.

German Search Report for application No. 102018210616 dated Feb. 1, 2019.

German Search Report for application No. 1020182099391 dated Feb. 27, 2019.

German Search Report for application No. 1020182099405 dated Feb. 28, 2019.

German Search Report for application No. 102018212712 dated Apr. 12, 2019.

German Search Report for application No. 102019205211 dated Sep. 5, 2019.

German Search Report for application No. 102019204706 dated Dec. 17, 2019.

Deere & Company, US Utility U.S. Appl. No. 15/879,796, filed Jan. 25, 2018.

Deere & Company, US Utility U.S. Appl. No. 15/971,867, filed May 4, 2018.

Deere & Company, US Utility U.S. Appl. No. 15/977,242, filed May 11, 2018.

Deere & Company, US Utility U.S. Appl. No. 16/371,598, filed Apr. 1, 2019.

Deere & Company, US Utility U.S. Appl. No. 16/670,210, filed Oct. 31, 2019.

Deere & Company, US Utility U.S. Appl. No. 16/555,913, filed Aug. 29, 2019.

USPTO, Office Action in U.S. Appl. No. 16/371,598 dated Jul. 21, 2020.

USPTO, Ex Parte Quayle Action issued in U.S. Appl. No. 17/171,856 dated Oct. 11, 2022.

German Search Report issued in application No. 102020213675.0 dated Mar. 17, 2021. (10 pages).

Extended European Search Report and Written Opinion issued in European Patent Application No. 20205965.5, dated Jul. 28, 2021, in 10 pages.

German Search Report issued in application No. DE102022210721.7 dated Jun. 1, 2023. (14 pages).

German Search Report issued in application No. DE102022210864.7 dated Jun. 23, 2023. (12 pages).

German Search Report issued in application No. DE102022210867.1 dated Jun. 30, 2023. (14 pages).

USPTO Non-Final Office Action issued in U.S. Appl. No. 15/971,867 dated Dec. 24, 2020.

(56) References Cited

OTHER PUBLICATIONS

USPTO Non-Final Office Action issued in U.S. Appl. No. 18/050,683 dated Aug. 3, 2023.

* cited by examiner

ENERGY MANAGEMENT SYSTEM FOR A HYBRID VEHICLE WITH AN ELECTRICALLY POWERED HYDRAULIC SYSTEM

RELATED APPLICATION

This document (including the drawings) claims priority and the benefit of the filing date based on U.S. provisional application No. 62/977,611, filed Feb. 17, 2020 under 35 U.S.C. § 119 (e), where the provisional application is hereby incorporated by reference herein.

DISCLOSURE

This disclosure relates to an energy management system for a hybrid vehicle with an electrically powered hydraulic system.

BACKGROUND

In certain prior art, an internal combustion engine may provide rotational energy to a hydraulic system via a variator such that the engine shaft can rotate at a different rotational speed than a hydraulic shaft of a hydraulic pump of a hydraulic system. However, if the engine is not able to provide sufficient rotational energy to the hydraulic pump because of a load (e.g., transient load) on the engine for a time period or interlude, the functionality or responsiveness of the hydraulic system may deteriorate temporarily for such interlude, which may interfere with the performance of one or more work tasks of a work vehicle (e.g., off-road work vehicle). Accordingly, there is a need for an energy management system for a hybrid vehicle with an electrically powered hydraulic system.

SUMMARY

In accordance with one embodiment, an energy management system for a ground work vehicle comprises an internal combustion engine for providing a primary rotational energy. A motor or electric machine (e.g., third electric machine) is configured to receive a portion of the primary rotational energy of an internal combustion engine or to provide secondary rotational energy to replace or supplement the primary rotational energy. A second inverter is configured to control the motor or electric machine. A rotatable pump shaft or pump rotor of hydraulic pump is coupled (e.g., controllably or selectively) to an engine shaft of internal combustion engine, a rotor of the electric machine, or both (e.g., via a variator) for receipt of at least a portion of the primary rotational energy, the secondary rotational energy, or both.

In accordance with one aspect of the disclosure, a hydraulic pump supplies hydraulic energy or pressurized hydraulic fluid to a hydraulic system load. A vehicle controller establishes a commanded rotor speed for the motor or electric machine based on a target pump rotational speed of a pump rotor or pump shaft for operation of the hydraulic pump at a set point or within an operational region consistent with the hydraulic system load or estimated work task of the vehicle for one or more sampling intervals, where the set point or operational region is defined by a hydraulic pump flow rate versus head characterization curve and where the target pump rotational speed can be independent of the engine shaft rotational speed (e.g. in a first mode).

DETAILED DESCRIPTION

Figure 1:
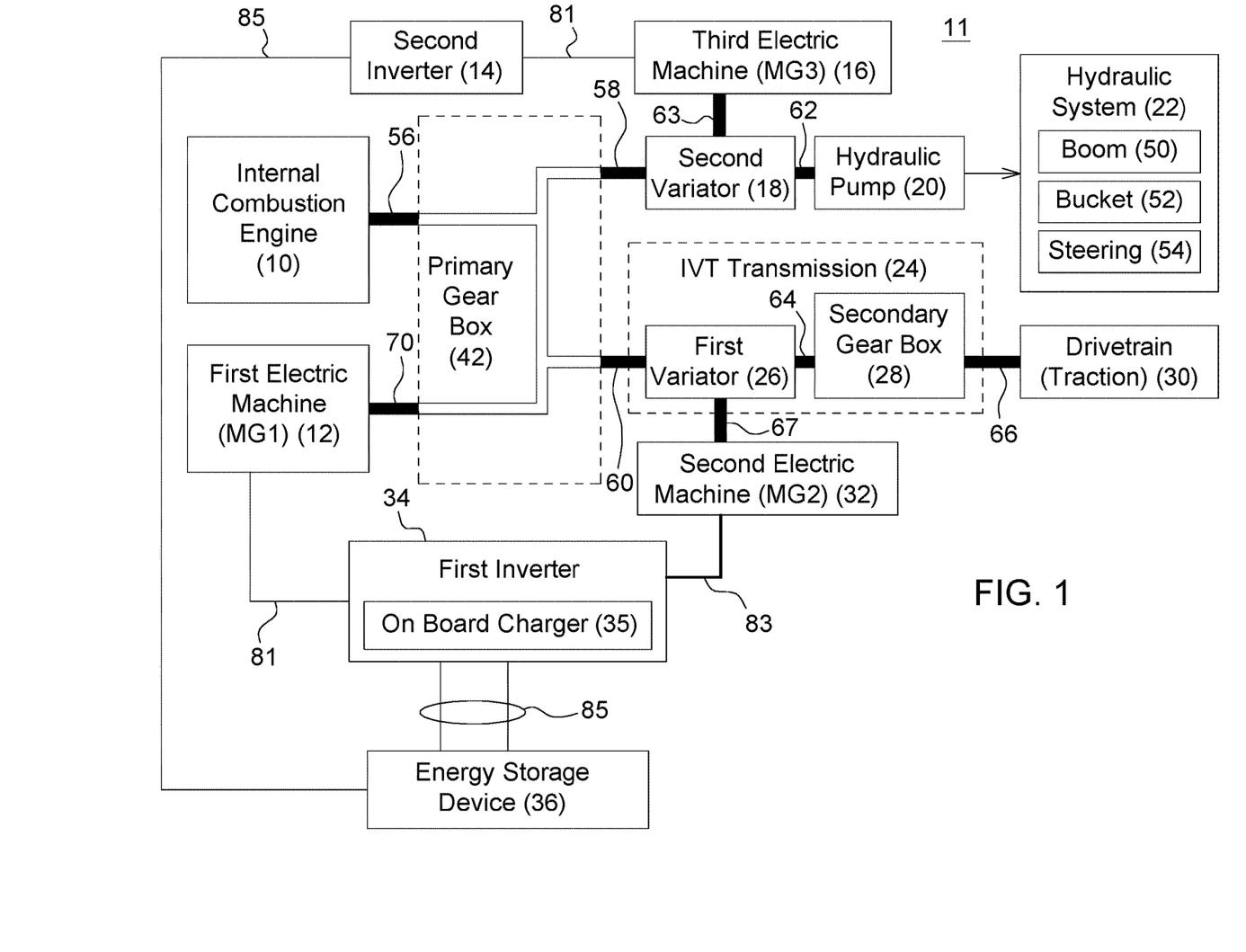
FIG. 1 is a block diagram of a first embodiment of an energy management system for a ground vehicle.

In accordance with one embodiment of FIG. 1, an energy management system 11 comprises an internal combustion engine 10 that is mechanically, rotationally coupled to a primary gearbox 42. The primary gearbox 42 comprises a shaft assembly, transmission or set of gears and associated clutches, such as electrohydraulic clutches or electromechanical clutches. The primary gearbox 42 can couple or decouple the rotational energy provided by the internal combustion engine 10 to one or more shafts (56, 58, 60, 70) associated with any of the following components: a first electric machine 12, a first variator 26, and a second variator 18.

In one embodiment, the first electric machine 12 is electrically coupled to the first inverter 34 to control the first electric machine 12 in a motoring mode or to control/support rectification of alternating current generated by the first electric machine 12 in a generating mode. The first inverter 34 is electrically coupled to the second electric machine 32 to control the second electric machine 32 in a motoring mode or to control/support rectification of alternating current generated by the second electric machine 32 in a generating mode. For example, alternating current (AC) output terminals (81, 83) of the first inverter 34 are coupled to the first electric machine 12 and the second electric machine 32, where the first inverter 34 may comprise a dual inverter. The first inverter 34 is electrically coupled to an energy storage device 36. The direct current (DC) terminals 85 of the first inverter 34 are coupled to the energy storage device 36. One or more vehicle controllers can provide data messages or commanded data to the first electric machine 12, the second electric machine 32, or both to operate in a motoring mode, a generating mode, or a power regeneration mode, where the motoring mode can discharge or draw electrical energy from the energy storage device 36 and where the generating mode can charge the energy storage device 36 with stored electrical energy.

The energy storage device 36 may comprise a battery, a bank of capacitors, an ultra-capacitor, a combination of batteries and capacitors, or another suitable energy storage device.

The second inverter 14 is electrically coupled to the third electric machine 16 to control the third electric machine 16 in a motoring mode or to control/support rectification of alternating current generated by the third electric machine 16 in a generating mode. The second inverter 14 is electrically coupled to the energy storage device 36 to facilitate charging or discharging of the energy storage device 36. For example, alternating current (AC) output terminals 81 of the second inverter 14 are coupled to the third electric machine 16. The direct current (DC) terminals 85 of the second inverter 14 are coupled to the energy storage device 36. In a motoring mode, the third electric machine 16 operates as a motor can draw stored electrical energy from the energy storage device 36, as directed by one or more vehicle controllers. In a generating mode, the third electric machine 16 operates as a generator to provide electrical energy to charge or store in the energy storage device 36.

In one configuration, the first variator 26 is mechanically, rotationally coupled or decoupled to a second input/output shaft 60 of the primary gearbox 42: (a) to receive primary rotational energy from the internal combustion engine 10, secondary rotational energy from the first electric machine 12, or both, or (b) to transmit primary rotational energy and/or secondary rotational energy (from the internal combustion engine 10 and/or from the first electric machine 12) to the second electric machine 32 and/or to the secondary gearbox 28, (c) to transmit tertiary rotational energy in a braking mode from the traction drivetrain 30 to the first electric machine 12, the second electric machine 32, or both. The traction drivetrain 30 refers to the traction drive, driveline, or other mechanical components that transmit torque or rotational energy to the wheels or tracks of the vehicle; the traction drivetrain may also refer to the drivetrain load or vehicle propulsion load associated with the traction drivetrain.

The first variator 26 is mechanically rotationally coupled or decoupled via hydraulically, mechanically or electromechanically controlled clutches, clutch plates, gears, or other engaging/disengaging rotational members. The first variator 26 is mechanically rotationally coupled or decoupled to a rotor of a second electric machine 32 and to a shaft of secondary gearbox 28. In turn, the secondary gearbox 28 is rotationally, mechanically coupled to the wheels or tracks of the vehicle via a traction drivetrain 30 or driveline. For example, the traction drivetrain 30 or driveline may comprise an axle, a transaxle, a differential box, a universal joint, a drive shaft, or other mechanisms or linkages for transferring rotational energy from the secondary gearbox 28 to the wheels or tracks of the vehicle. In one embodiment, the combination of the first variator 26 and the secondary gearbox may comprise an infinitely variable transmission 24. The mechanical coupling or mechanical connection between the first variator 26 and the second electric machine 32 can be referred to as a driveline rotational interface 67 or driveline linkage. Similarly, the mechanical coupling or mechanical connection between the first variator 26 and the secondary gearbox 28 may be referred to as a driveline rotational interface 67 or a driveline linkage, which in certain configurations is integral with the infinitely variable transmission 24.

The second variator 18 is mechanically, rotationally coupled or decoupled to a first input/output shaft 58 of the primary gearbox 42. At the direction of one or more vehicle controllers, the primary gearbox 42 can support coupling or decoupling between the first input shaft 56 and the first input/output shaft 58 to facilitate providing secondary rotational energy to the hydraulic pump 20 solely from the third electric machine 16, or to facilitate providing rotational energy jointly from the third electric machine 16 and the internal combustion engine 10. The second variator 18 is mechanically, rotationally coupled or decoupled via hydraulically, mechanically or electromechanically controlled clutches, clutch plates, gears, or other engaging/disengaging rotational members: (a) to a rotor of the third electric machine 16, or (b) to a pump shaft or pump rotor of the hydraulic pump 20, or (c) both to the rotor of the third electric machine 16 and the hydraulic pump 20 simultaneously. In turn, a discharge or output of the hydraulic pump 20 has a hydraulic line or conduit coupled to the hydraulic system 22. In practice, the hydraulic pump 20 may comprise one or more hydraulic pumps that are distributed within a hydraulic system 22 that supports one or more implements.

The hydraulic system 22 may be configured in accordance with various examples that can be applied separately or cumulatively. In a first example, the hydraulic system 22 may comprise the hydraulic pump 20 and one or more hydraulic components, such as one or more electrohydraulic cylinders that are associated with an implement or tool of a work vehicle. For example, in the hydraulic system 22 the hydraulic pump 20 may provide pressurized hydraulic fluid, directly or indirectly, to one or more electrohydraulic cylinders via hydraulic lines, feedback lines, recirculation lines, redundant lines, connections, electrohydraulic valves, and accumulators that form a suitable hydraulic network for operation of a mobile implement of a work vehicle that can be controlled by an operator and/or a data processing system.

In a second example, a first electrohydraulic cylinder associated with moving (e.g., raising or lowering) a boom of a boom system 50 or arm (of an implement) relative to the ground work vehicle. In a third example, the hydraulic system 22 may comprise a second electrohydraulic cylinder associated with moving a bucket of a bucket system 52, fork or another implement tool. In a fourth example, the hydraulic system 22 may comprise a dual electrohydraulic cylinder for a hydraulic steering system 54 or controlling the steering system 54 or yaw angle of the wheels of the vehicle.

In an alternate embodiment, the primary gearbox 42, the first variator 26 and the second variator 18 are combined in an aggregate transmission system.

In accordance with one embodiment of FIG. 1, an energy management system 11 for a ground vehicle comprises an internal combustion engine 10 for providing a primary rotational energy. A first electric machine 12 (e.g., generator) is configured to receive a portion of the primary rotational energy, while operating in a generating mode or braking/regeneration mode. A second electric machine 32 (e.g., motor) is configured to provide secondary rotational energy to replace or supplement the primary rotational energy, while operating in a motoring mode. A third electric machine 16 (e.g., motor) is configured to receive a portion of the primary rotational energy in a generating mode or to provide secondary electrical energy to replace or supplement the primary rotational energy in a motoring mode.

A first inverter 34 may comprise a dual inverter with a primary inverter that is configured control the first electric machine 12 in a motoring mode, a generating mode, a braking/regeneration mode, or any combination of the above modes. For example, during a generating mode, the primary inverter is configured to rectify alternating current output by the first electric machine 12. Further, the first inverter 34 may comprise a dual inverter with a secondary inverter to control the second electric machine 32 in a motoring mode, a generating mode, a braking/regeneration mode, or any combination of the above modes. Meanwhile, a second inverter 14 is configured to control the third electric machine 16.

A rotatable pump shaft or pump rotor of hydraulic pump 20 is coupled (e.g., controllably or selectively) to an engine shaft of internal combustion engine 10, a rotor of the third electric machine 16, or both for receipt of at least a portion of the primary rotational energy, the secondary rotational energy, or both. The hydraulic pump 20 supplies hydraulic energy to a hydraulic system 22 load (e.g., implement load). As illustrated in FIG. 1, the hydraulic system 22 may include hydraulic components or hydraulic loads associated with any of the following implement or vehicle systems: (a) hydraulic boom system 50, (b) hydraulic tool system (e.g., hydraulic bucket system 52, fork or tool system), and (c) hydraulic steering system 54.

Figure 4A:
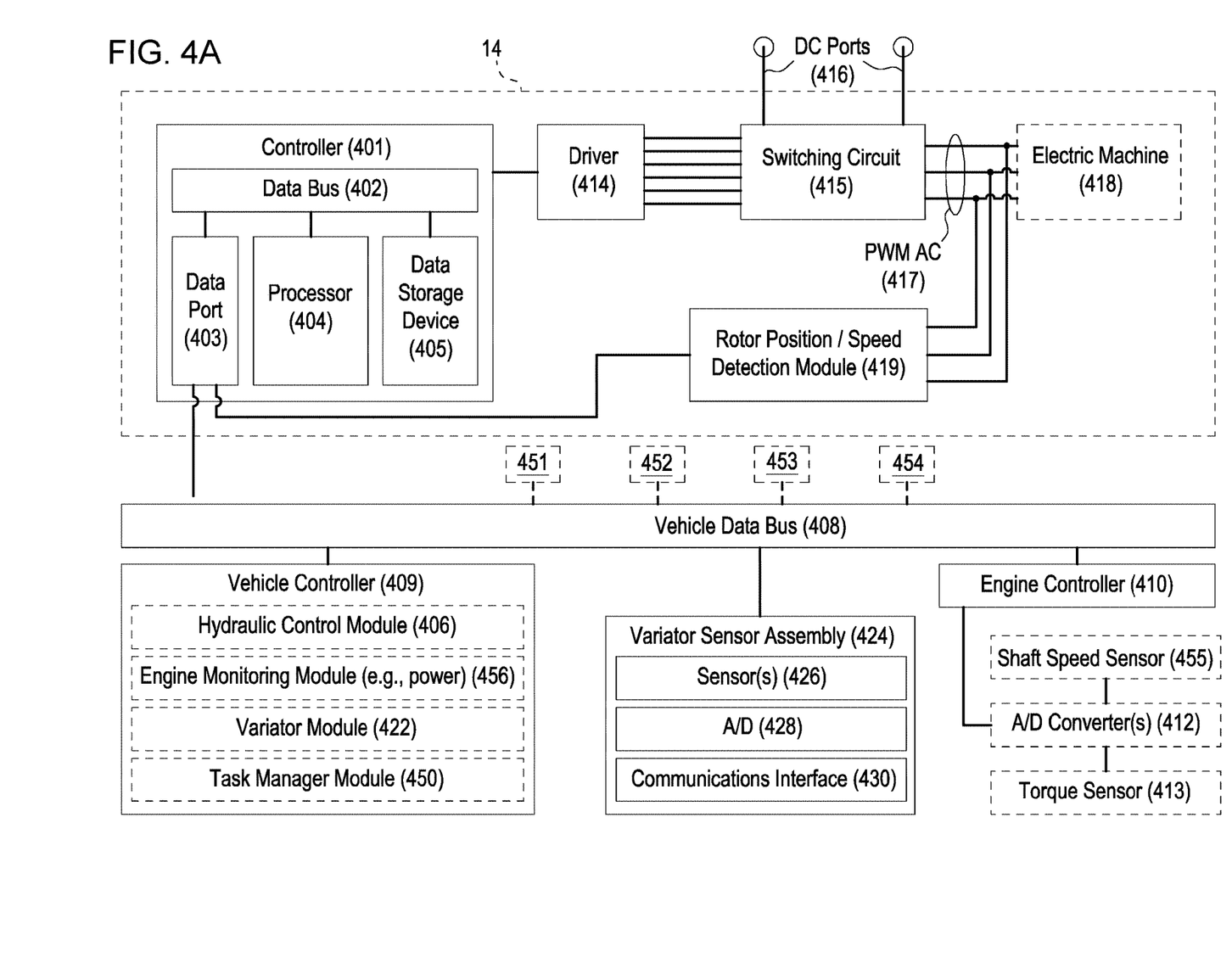
FIG. 4A is a block diagram of one embodiment of an inverter and a vehicle electronics system for a ground vehicle.

In FIG. 4A in conjunction with FIG. 1, a vehicle controller 409 establishes a commanded rotor speed for (e.g., application to the second inverter 14 for control of) the third electric machine 16 based on a target pump shaft rotational speed for operation of the hydraulic pump 20 at a set point or within an operational region consistent with an observed hydraulic load (e.g., load curve 502 in FIG. 5) or estimated work task of the vehicle for one or more sampling intervals, which can effectively shift or temporarily modify the observed hydraulic load curve (e.g., by a fixed amount upward or downward with respect to the vertical axis along the entire hydraulic load curve) for one or more sampling intervals or for a vehicle session at a worksite. For example, the set point or operational region of the hydraulic pump 20 is defined by a hydraulic pump flow rate 510 versus head 508 characterization curve (e.g., pump output curve 506 in FIG. 5) where the target pump rotational speed can be independent of the engine shaft rotational speed. The target pump rotational stepped can be independent of the engine shaft rotational speed if and to the extent that the engine shaft is coupled or decoupled from the pump shaft or pump rotor of the hydraulic pump 20 for one or more sampling intervals to address transient hydraulic loads on the hydraulic system 22 in a first mode of operation of the energy management system 11.

In one example, the first mode may comprise an electrically driven mode that is solely electrically driven by the third electric machine 16 or motor. Further, in the first mode the target rotational speed of the pump shaft or pump rotor is generally independent of the power output of the internal combustion engine 10.

In another example, the second mode of operation may comprise an engine driven mode that is solely mechanically driven by the internal combustion engine 10. For instance, a variator (e.g., second variator 18) is coupled between the internal combustion engine 10 and the hydraulic pump 20 such that the pump rotor or pump shaft is rotationally, mechanically coupled to the engine shaft in the second mode.

In yet another example, third mode of operation may comprise a hybrid of the first mode and the second mode. The third mode may comprise the joint or simultaneous operation of an electrically driven mode and an engine-driven mode. For example, a variator (e.g., second variator 18) intervenes between the hydraulic pump 20 and the internal combustion engine 10 and intervenes between the hydraulic pump 20 and the electric machine (e.g., third electric machine 16). Further in the third mode, a pump rotor or pump shaft is rotationally simultaneously coupled to the rotor of the electric machine (e.g., 16) and to the engine shaft. That is, in a third mode or torque-assist mode, the primary rotational energy and the secondary rotational energy are applied simultaneously to the pump rotor or pump shaft. In one configuration, the vehicle controller 409 or variator module 422 controls the second variator 18 to operate in the first mode, the second mode or the third mode.

In one embodiment, the primary gearbox 42 comprises a gearbox, a transmission, a shaft assembly, a gearbox or shaft assembly with clutches, clutch plates or rotational members that are actuated, activated or deactivated by control signals from one or more vehicle controllers (e.g., 409 in FIG. 4A). As illustrated in FIG. 1, a primary gearbox 42 has a first input shaft 56 coupled to receive the primary rotational energy from an engine shaft of the internal combustion engine 10. The primary gearbox 42 has a first input/output shaft 58, a second input/output shaft 60, and a third input/output shaft 70. The primary gearbox 42 may comprise any of the following engaging shaft portions, wheels, gears, clutches, or mechanical assemblies for coupling or decoupling any combination of the first input shaft 56, the first input/output shaft 58, the second input/output shaft 60, and/or the third input/output shaft 70 in response to control data messages from any of the following components: vehicle controller 409, variator module 422, engine monitoring module 456, hydraulic control module 406, and task manager module 450.

As illustrated the energy management system 11 of FIG. 1 comprises a first electric machine 12, a second electric machine 32, and a third electric machine 16. Each electric machine may comprise a motor, a generator, an alternator, an alternating current motor, a three-phase motor, an integral permanent magnet motor, or an induction motor. For example, each electric machine may operate in a generating mode, a motoring mode, or a braking or regeneration mode, consistent with the control signals of a motor controller or inverter (34, 14) coupled to a corresponding electric machine (12, 32, 16).

In FIG. 1, a first electric machine 12 (e.g., generator) is configured to receive a portion of the primary rotational energy from the internal combustion engine 10 via the primary gearbox 42, if the primary gearbox 42 couples the first input shaft 56 to the third input/output shaft 70. A second electric machine 32 (e.g., motor) is configured to provide secondary rotational energy to the first variator 26 via driveline rotational interface 67 to replace or supplement the primary rotational energy. In a first example, the second electric machine 32 is configured to provide secondary rotational energy to replace the primary rotational energy if the first input shaft 56 is decoupled from the second input/output shaft 60. The first inverter 34 can draw electrical current from the energy storage device 36 to power the second electric machine 32 in the motoring mode.

In a second example, the second electric machine 32 is provided to supplement the primary rotational energy of the internal combustion engine 10 in a torque-assist or torque supplemental mode if the first input shaft 56 is coupled to the second input/output shaft 60 and if the rotor of the second electric machine 32 is coupled to the second/input output shaft 60 via the first variator 26 or electronic infinitely variable transmission 24.

A third electric machine 16 (e.g., motor) is configured to receive a portion of the primary rotational energy or to provide secondary electrical energy to replace or supplement the primary rotational energy. The second inverter 14 can draw electrical current from the energy storage device 36 to power the third electric machine 16 in the motoring mode.

A hydraulic system load of the hydraulic system 22 is coupled to the first/input output shaft 58 for receipt of at least a first portion of the primary rotational energy; the hydraulic system load of the hydraulic system 22 is coupled to the implement rotational interface 63 for receipt of secondary rotational energy. In particular, the rotatable pump shaft or pump rotor of the hydraulic system 22 is coupled to the rotatable shaft of the third electric machine 16. The hydraulic system load of the hydraulic system 22 comprises a hydraulic load of an implement of the vehicle.

The second inverter 14 is configured to control the commanded rotor speed of the third electric machine 16 in a motoring mode to operate the hydraulic pump 20 at a target operational set point 505 (e.g., in FIG. 5) or within the target operational region 504, where the commanded rotor speed is independent of the engine speed of an engine shaft of the internal combustion engine 10. In one configuration, the vehicle controller 409 (in FIG. 4A) estimates or provides the commanded rotor speed of the third electric machine 16 to the second inverter 14; the second inverter 14 is configured to control the third electric machine 16 to rotate a pump shaft or rotor shaft of a hydraulic pump 20 of the hydraulic system 22, (via a second variator 18), at a target operational set point or within a target operational region of the hydraulic pump 20 defined by the hydraulic pump flow rate 510 versus head 508 characterization curve, such as the characterization curve of FIG. 5 or variants thereof.

Figure 5:
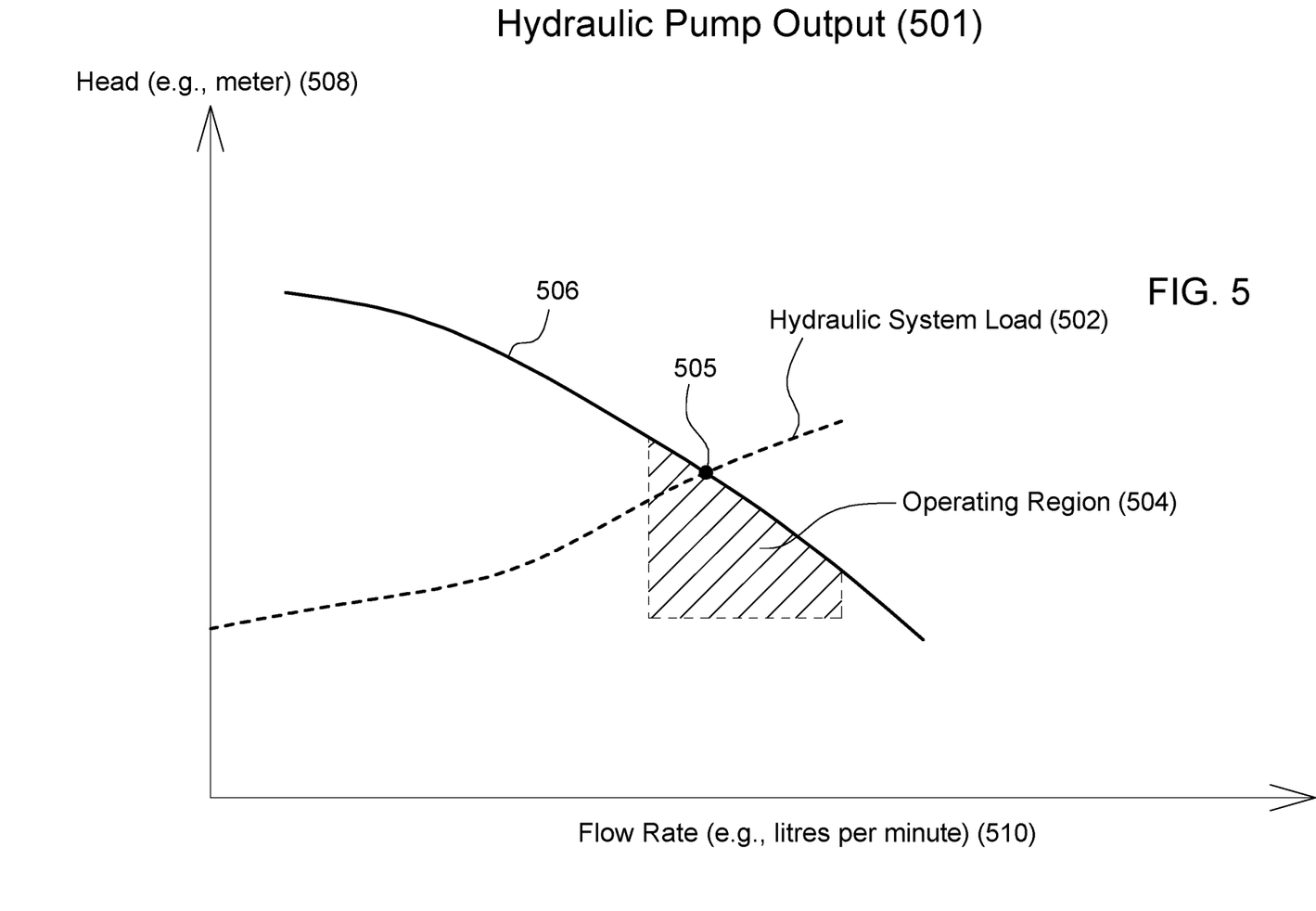
FIG. 5 is a chart of head versus flow rate for a hydraulic pump of a hydraulic system of a ground vehicle.

In one embodiment, the target rotational speed of the pump shaft or pump rotor can be estimated based on the one or more of the following parameters: (a) a target operational set point of a pump output curve 506, (b) a target operational region of the hydraulic pump 20, (c) hydraulic system load curve 502, (d) an identified task or classified work task of an implement, or modification of the hydraulic system load curve based on the identified task or classified work task for a work session or one or more sampling intervals of work vehicle operation at one or more worksites; (d) historic or observed average, median, mode implement hydraulic loads or task loads for a work session, a work site, or one or more sampling intervals. Advantageously, in certain embodiments and operational modes, such as the first mode, the target rotational speed of the pump shaft or pump rotor can be generally independent of the power output of the internal combustion engine 1. However, in the third mode or the torque-assist mode the engine shaft and the rotor of the third electric machine 16 rotate generally synchronously at the same rotational speed.

In FIG. 1, the second variator 18 is coupled between the hydraulic pump 20 and the electric machine such that the pump rotor or pump shaft is rotationally, mechanically coupled to the rotor of the electric machine (e.g., third electric machine 16) via the rotational interface 63. The second variator 18 is coupled (or decoupled) between the internal combustion engine 10 and the hydraulic pump 20 such that the pump rotor or pump shaft (of the hydraulic pump 20) is rotationally, mechanically coupled to the engine shaft. Further, the primary gearbox 42 is coupled (or decoupled) between the internal combustion engine 10 and the second variator 18 such that the engine shaft (e.g., coupled to input shaft 56) is coupled (or decoupled) to an input shaft (e.g., associated with first input/output shaft 58) of the variator 18 to contribute primary rotational energy to the hydraulic pump 20.

In one embodiment, the engine size or engine power of the internal combustion engine 10 can be decreased independently of the hydraulic load and the target operational set point or target operational region required for efficient operation of the hydraulic pump 20 associated with a corresponding task load profile. The reduction of engine size or engine power can be accomplished by reduction of engine torque versus engine speed curve, or a modification or translation of the engine torque versus engine speed curve, for example. Moreover, the reduction of engine power can be achieved by the engine controller 410 or vehicle controller 409 limiting the engine 10: (1) to operate in a certain target operating region of the engine torque versus engine speed curve, (2) by adjusting fuel injection, fuel metering, and/or (3) by reduction of intake air pressure or boost pressure, relative to atmospheric pressure, associated with turbocharging or supercharging components of the engine 10. In certain configurations, the engine monitoring module 456, alone or together with the engine controller 410, may receive or estimate the engine power output or engine load for a sampling interval or work session based on measured or observed torque data and rotational speed data for the engine shaft of the engine 10.

In one embodiment, a task load manager module 450 or vehicle controller 409 may classify or identify a task or task load for a sampling interval or a session to modify, estimate or determine a hydraulic load or observed hydraulic system load of the hydraulic system 22 associated with one or more vehicle implements. The task load manager module 450 may function, alone or together, with the hydraulic control module 406 to modify, enhance or refine an initial hydraulic load estimate estimated by the hydraulic control module 406. For example, a vehicle controller 409 or task manager module 450 may estimate or determine a task load or hydraulic load of the hydraulic system 22 of the work vehicle, which may be associated with or correlated to one or more of the following tasks or work functions, which can be executed separately or together.

Under a first task or first task load for one or more sampling intervals or a work session of the work vehicle at a worksite, the vehicle controller 409 or task manager module 450 determines, identifies or classifies that the work vehicle is engaged in a rise/run operation in which the load has a hydraulic implement load component (e.g., rise component) for moving/raising the implement with respect to ground (or above the ground) and traction drive load component (e.g., run component) for moving the vehicle with respect to the ground.

Under a second task or second task load for one or more sampling intervals or a work session of the work vehicle at a worksite, the vehicle controller 409 or task manager module 450 determines, identifies or classifies a rise/run operation that comprises raising a reference point on the implement from a first height to and second height, with a zero mass load or a reference mass load, and accelerating the vehicle along a path from a first position (e.g., two or three dimensional coordinates) to a second position.

Under a third task or third task load for one or more sampling intervals or a work session of the work vehicle at a worksite, the vehicle controller 409 or task manager module 450 determines, identifies or classifies that: (a) the rise/run operation relates to an implement that comprises an arm, a boom of a boom system 50, and tool or bucket of a bucket system 52 of excavator and (b) the rise/run operation has a reference hydraulic system load, a reference hydraulic pressure, and a reference hydraulic flow rate for one or more hydraulic actuators, where the reference values may comprise historic values, mean, mode, median or other statistical analysis for a session, worksite, affiliated work session at corresponding worksites, or the like.

Under a fourth task or fourth task load for one or more sampling intervals or a work session of the work vehicle at a worksite, the vehicle controller 409 or task manager module 450 determines, identifies or classifies that: (a) the rise/run operation relates to an implement that comprises an arm or bucket of a bucket system or fork of a loader and (b) the rise/run operation has a reference hydraulic system load, a reference hydraulic pressure, and a reference hydraulic flow rate for one or more hydraulic actuators, where the reference values may comprise historic values, mean, mode, median or other statistical analysis for a session, worksite, affiliated work session at corresponding worksites, or the like.

Under a fifth task or fifth task load for one or more sampling intervals or a work session of the work vehicle at a worksite, the vehicle controller 409 or task manager module 450 determines, identifies or classifies that the rise/run operation requires a minimum rotational speed of hydraulic pump 20 of the vehicle or a requisite operational range of rotational speed that is defined by a lower rotational speed limit, an upper rotational speed limit, or both. Under a sixth task or sixth task load for one or more sampling intervals or a work session of the work vehicle at a worksite, the vehicle controller 409 or task manager module 450 determines, identifies or classifies that the rise/run operation requires a first minimum rotational speed (e.g., approximately 1600 rpm) or first rotational speed range (e.g., approximately 1400 rpm to 1800 rpm) of the hydraulic pump 20 of the vehicle, whereas the transmission 24 requires a second minimum rotational speed (e.g., approximately 1100 rpm) or second rotational speed range (e.g., approximately 1000 rpm to 1200 rpm) of the hydraulic pump 20, wherein the first minimum rotational speed is greater than the second minimum rotational speed. Under a seventh task or seventh task load for one or more sampling intervals or a work session of the work vehicle at a worksite, the vehicle controller 409 or task manager module 450 determines, identifies or classifies that, the vehicle comprises a loader that is digging into a pile of material that demands that internal combustion engine 10 operate at or near a peak torque corresponding to respective engine shaft speed, unless the engine operates a lower engine shaft speed below the peak torque with supplemental torque provided by the first inverter 34 controlling the first electric machine 12. Under an eighth task or eighth task load for one or more sampling intervals or a work session of the work vehicle at a worksite, the vehicle controller 409 or task manager module 450 determines, identifies or classifies that: (a) the vehicle is braked and the first electric machine 12 and the second electric machine 32 operate in a generating mode to oppose the movement of the vehicle along the ground via traction drivetrain 30 and to generate alternating current (AC) electrical energy for application to the first inverter 34, which in turn rectifies the AC into DC for application to the energy storage device 36; (b) the vehicle controller 409 tracks or stores records of the braking or regenerating mode and a duration that the work vehicle is plugged into or connected to an optional AC line 40 on or associated with the optional AC power grid 38. The AC line 40 and the AC power grid are optional, as indicated by the dashed lines and may be deleted from certain embodiments.

Figure 2:
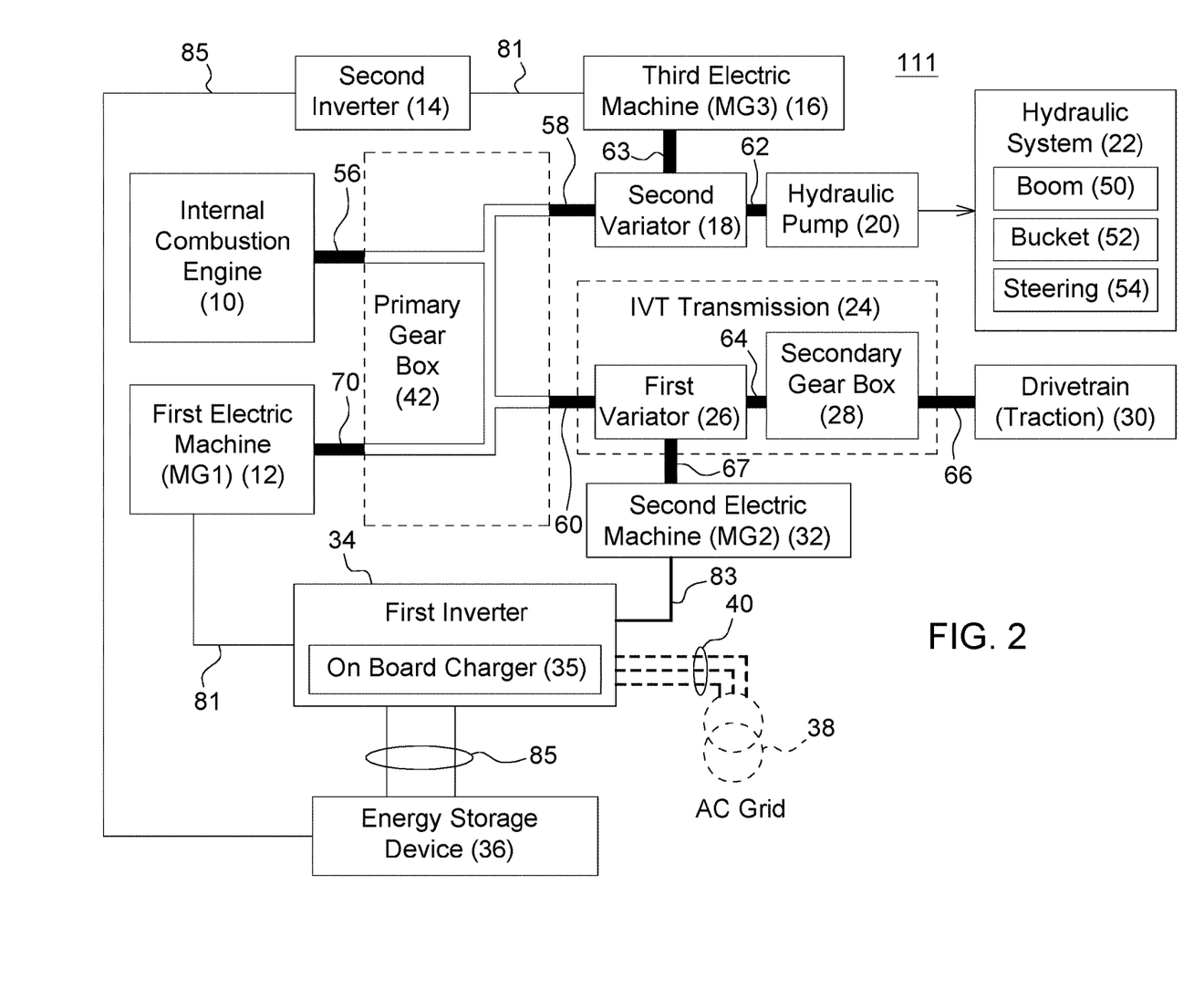
FIG. 2 is a block diagram of second embodiment of an energy management system for a ground vehicle.

The energy management system 111 of FIG. 2 is similar to the energy management system 11 of FIG. 1, except in the system 111 of FIG. 2 the first inverter 34 further comprises a power supply or on-board charger 35. In particular, the first inverter 34 may further comprise a power supply or on-board charger 35 for converting an alternating current signal associated with an alternating current (AC) power line 38 or AC power grid 38 to direct current (DC) signal power charging an energy storage device 36 of the vehicle. Like reference numbers in FIGS. 1 and 2 indicate like elements or features.

Figure 3:
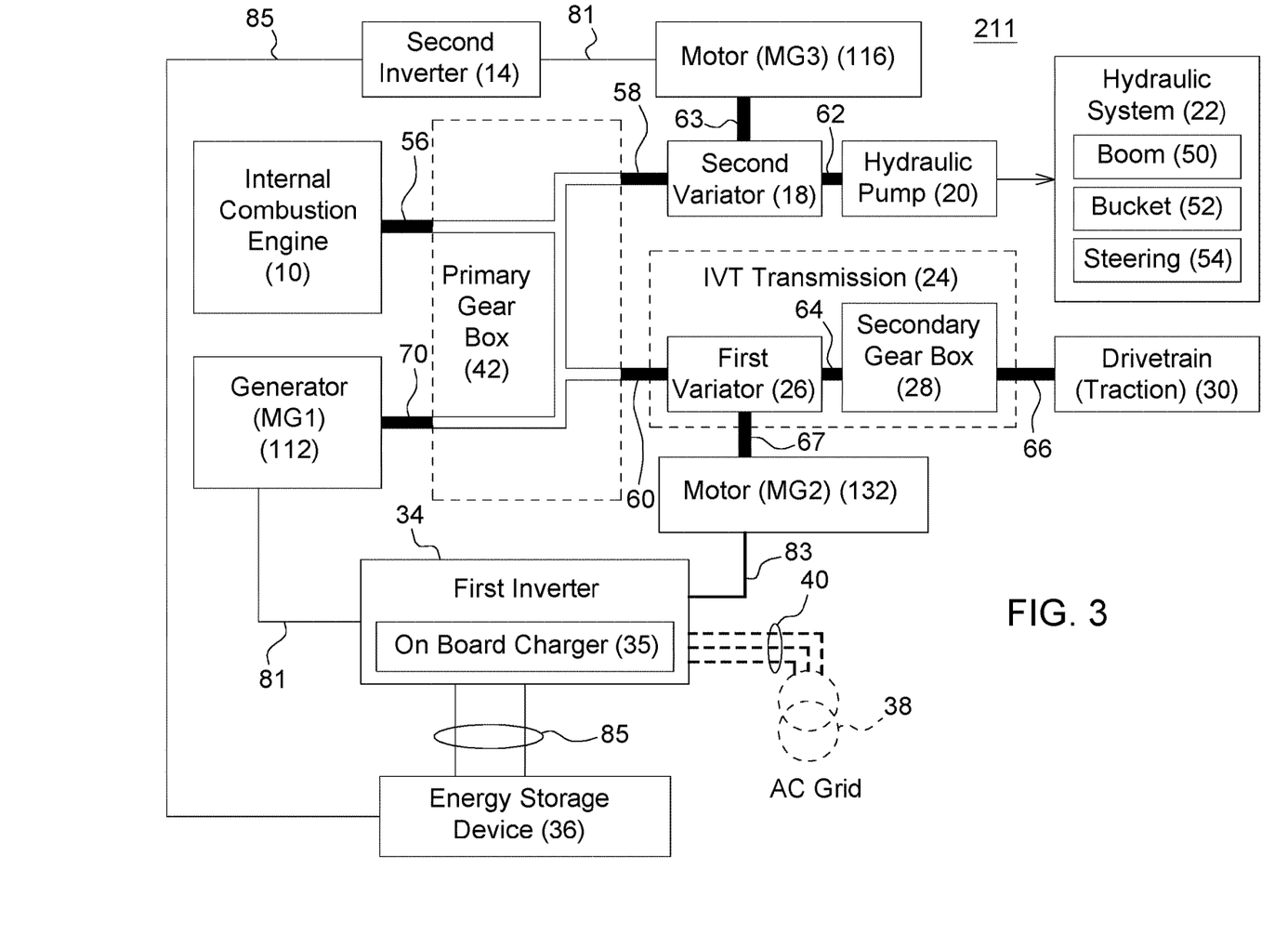
FIG. 3 is a block diagram of third embodiment of an energy management system for a ground vehicle.

The energy management system 211 of FIG. 3 is similar to the energy management system 11 of FIG. 1, except in the system 211 of FIG. 3 each of electric machines (112, 116, 132) is defined as a motor or a generator, although this does not technically restrict or limit the motor from operating as generator, or vice versa. In particular, in FIG. 3 the first electric machine 12 (of FIG. 1) is designated as a generator 112; the second electric machine 32 (of FIG. 1) is designated as a motor 132; the third electric machine 16 (of FIG. 1) is designated as motor 116. Like reference numbers in FIGS. 1 and 3 indicate like elements or features.

In one embodiment, the first inverter 34 comprises a dual inverter having primary alternating current (AC) terminals 81, secondary AC terminals 83, and DC terminals 85. The DC terminals 85 are coupled to the energy storage system 36. The primary AC terminals 81 are coupled to the generator 112 and the secondary AC terminals 83 are coupled to the motor 132. The inverter 34 generates motor command data for the motor 132 in a torque control mode or speed control mode based on data messages of the vehicle controller 409.

In one embodiment, the energy management system (11, 111, 211) comprises an energy storage device 36. A first inverter 34 is coupled to the energy storage device 36. The second electric machine (32, 132) is configured for control by the inverter. The second electric machine (32, 132) is configured to provide tertiary rotational energy to replace or supplement the primary rotational energy of the internal combustion engine 10. For example, the second electric machine (32, 132) can replace or supplement the primary rotational energy of the internal combustion engine 10, where an engine size, engine power, fuel consumption, and emissions of the internal combustion engine 10 is minimized or decreased in accordance with any of the following: an engine compression is decreased, a stoichiometric ratio of the fuel-air mixture is reduced, a boost pressure of a turbo charger or electrically driven boost machine reduced or eliminated (e.g., run as naturally aspirated engine), the fuel injection or fuel metering is adjusted.

In one configuration, the second electric machine (32, 132) has greater power capacity than the third electric machine (16, 116). In one embodiment, the first inverter 34 is configured to convert auxiliary alternating current (AC) into direct current (DC) for charging the energy storage device 36 if the vehicle is stationary or in a park mode (as sensed by a motion sensor in communication with the vehicle data bus) and if the auxiliary alternating current is provided from a connection to an alternating current line 40 of an alternating current power grid 38 or network. The first inverter 34 comprises a dual inverter that is coupled to the first electric machine 12, or the second electric machine 32, or both. The first electric machine (12, 112) and the second electric machine (32, 132) can operate in a motoring mode to supplement or replace the primary rotational energy of the internal combustion engine 10.

In one embodiment, an electrically driven infinitely variable transmission 24 comprises a first variator 26 for receiving secondary rotational energy of the first electric machine 12, the second electric machine 32 or both via (input) shafts (60, 67) or rotational interfaces of the electrically driven infinitely variable transmission 24. The first electric machine 12, or the second electric machine 32 can separately or together operate in the motoring mode to supplement or replace the primary rotational energy with additional torque to prevent stall of the internal combustion engine 10 during transient loads or transient traction drive loads. An electrically driven/supplemented infinitely variable transmission 24 or a first variator 26 is configured to transmit the primary rotational energy of the internal combustion engine 10 to the first electric machine 12, the second electric machine 32 or both via shafts (56, 60, 67, 70) or rotational interfaces of the electrically driven infinitely variable transmission 24 and the primary gearbox 42. For example, the first electric machine 12, or the second electric machine 32 can separately or together operate (in the generating mode.

In one embodiment, a traction drive load 30 is associated with propulsion of the work vehicle with respect to the ground. A vehicle controller 409 (in FIG. 4A) is adapted to for simultaneously generating an primary commanded speed command for the second inverter 14 to apply to the third electric machine 16 (or motor 116) and for generating a secondary commanded speed command for the first inverter 34 to apply to the first electric machine 12 or the second electric machine 32, wherein the primary commanded speed command is different from the secondary commanded speed command; wherein the primary commanded speed command addresses the hydraulic load of the hydraulic system 22 and wherein the secondary speed command addresses the traction load of traction drivetrain 30 simultaneously.

FIG. 4A is a block diagram of an inverter and a vehicle electronics system for a ground work vehicle. For example, the inverter of FIG. 4A may comprise the primary or secondary inverter of the first inverter 34 or second inverter 14. In one embodiment of FIG. 4A, an inverter 14 comprises a controller 401 coupled to a driver 414. In turn, the driver 414 is coupled to a switching circuit 415, where the switching circuit 415 may have direct current (DC) terminals 416 and alternating current (AC) terminals 417, such as pulse-width-modulation (PWM) AC output signals for a three phase electric machine 418. The AC terminals 417 or the switching circuit 415 may be coupled to an electric machine 418. A rotor position/speed detection module 419 is coupled to the switching circuit 415 and the controller 401 to provide control feedback to the controller 401.

In one embodiment, the controller 401 comprises an electronic data processor 404, a data storage device 405 and a data port 403 that are coupled to a data bus 402. The electronic data processor 404, the data storage device 405, and the data port 403 may communicate with each other via the data bus 402. The electronic data processor 404 may comprise a microcontroller, a microprocessor, a programmable logic array, a field programmable gate array, an application specific integrate circuit, a digital signal processor, a logic circuit, an arithmetic logic unit, or the like. The data storage device 405 may comprise electronic memory, nonvolatile electronic random access memory, a magnetic data storage device, an optical data storage device, a hard disk, or the like.

In one embodiment, a rotor position/speed detection module 419 detects a rotor position of the electric machine 418 and may provide a feedback signal based on the rotor position of the controller 401. The electric machine 418 may comprise one or more of the following: a first electric machine 12, a generator 112, a second electric machine 32, motor 132, a third electric machine 16 and motor 116.

A vehicle controller 409 or another data processor (e.g., 404) may send a commanded speed of the electric machine, such as the third electric machine 16, or a commanded torque of the electric machine to control precisely the hydraulic pump 20 to a target operating point or target operating region 504 consistent with an observed load (e.g., identified or classified load task) on the hydraulic system 22 that the pump supplies with pressurized hydraulic fluid/energy.

The second inverter 14 may be coupled to the vehicle data bus 408 via a data port 403. Further, one or more vehicle controller(s) 409, an engine controller 410, a variator sensor assembly 424, and optional variator sensors 426 may be coupled to the vehicle data bus 408. As illustrated in FIG. 4A, the variator sensor assembly 424 comprises an analog-to-digital converter 428 to convert measured, observed signals into digital signals and a communications interface 430 to interface with the vehicle data bus 408. For example, the communications interface 430 may comprise data buffer for storing a set of measured, observed signals for transmission via a transceiver.

In FIG. 4A, one or more hydraulic pressure sensors 451, hydraulic flow sensors 452, hydraulic linear position sensors 453, and motion sensor 454 may be coupled to the vehicle data bus 408. Further, each of the above optional sensors (451, 452, 453, 454) may be associated with an analog-to-digital converter to convert measured, observed signals into digital signals and a communications interface to interface with the vehicle data bus 408. For example, the communications interface may comprise data buffer for storing a set of measured, observed signals for transmission via a transceiver; such analog-to-digital converter and communications interface may be similar to or identical to those illustrated in conjunction with the variator sensor assembly.

In one embodiment, each hydraulic pressure sensor 451 and each hydraulic flow sensor 452 is associated with a corresponding hydraulic actuator, hydraulic cylinder or electrohydraulic cylinder of the hydraulic system 22, such as the hydraulic boom system 50, the hydraulic bucket system 52 or other hydraulic implement system, actuator or component. Meanwhile, the engine controller 410 may receiver sensor measurements or observations from a shaft speed sensor 455, and a torque sensor 413, directly or indirectly, via an optional analog-to-digital converter 412. For example, the shaft speed sensor 455 may comprise a magnetic field sensor that senses a magnetic field or change in magnetic field associated with one or more magnets in or secured to an engine shaft or related rotational component of the engine 10. The shaft speed sensor 455 can provide an observed rotational speed of the engine shaft of the engine 10 during one or more sampling intervals, while the torque sensor 413 can simultaneously an observed torque associated with the engine shaft to estimate the available engine power for driving the observed or current hydraulic load of the hydraulic pump 20 and hydraulic system 22. If the available engine power or observed torque is less than a critical threshold, the engine controller 410 or vehicle controller 409 can control the energy management system to operate in third mode or torque assist mode to provide secondary rotational energy from an electric machine to the hydraulic pump 20 (combined with the primary rotational energy from the engine 10).

In FIG. 4A, the sensor readings, measurements or observations from the sensors (426, 451, 452, 453, 454) may be configured or interpreted by the vehicle controller 409 (or its task manager module 450) in accordance with various examples, which may be applied separately or cumulatively. In a first example, a first hydraulic pressure sensor 451 and first hydraulic flow sensor 452 are associated with a first actuator (e.g., first electrohydraulic cylinder) having an anchored end that is attached (rotatably attached) to a vehicle body and a linearly movable end that is attached to an implement (e.g., arm or boom of the boom system 50) for moving (e.g., raising or lowering the boom). In a second example, a second hydraulic pressure sensor 451 and second hydraulic flow sensor 452 are associated with a second actuator (e.g., second electrohydraulic cylinder) having an anchored end that is attached (rotatably attached) to an implement (e.g., arm or boom system 50) and a linearly movable end that is attached to an implement tool (e.g., bucket, fork, cutter, or another tool) for moving, guiding or manipulating a path of the implement tool.

In a third example, the first hydraulic pressure sensor 451 and the first hydraulic flow sensor 452 are configured to observe mass/load in the implement tool (e.g., loader bucket). In a fourth example, an optional hydraulic cylinder linear position sensor 453 observes the extension, retraction or both of the linearly moveable end of the first electrohydraulic cylinder to detect changes from a first height to a second height, where the second height is greater than a first height. In a fifth example, the, an optional hydraulic cylinder linear position sensor 453 is configured to observe height movements/maintenance that impact load for repetitive operations).

In one embodiment, a motion sensor 454 may comprise a ground speed sensor, velocity sensor, or acceleration sensor. For example, the motion sensor 454 may comprise any of the following an odometer, accelerometer, gyroscope, inertial measurement unit (IMU) a satellite navigation receiver (e.g., GPS receiver), or the like.

Figure 4B:
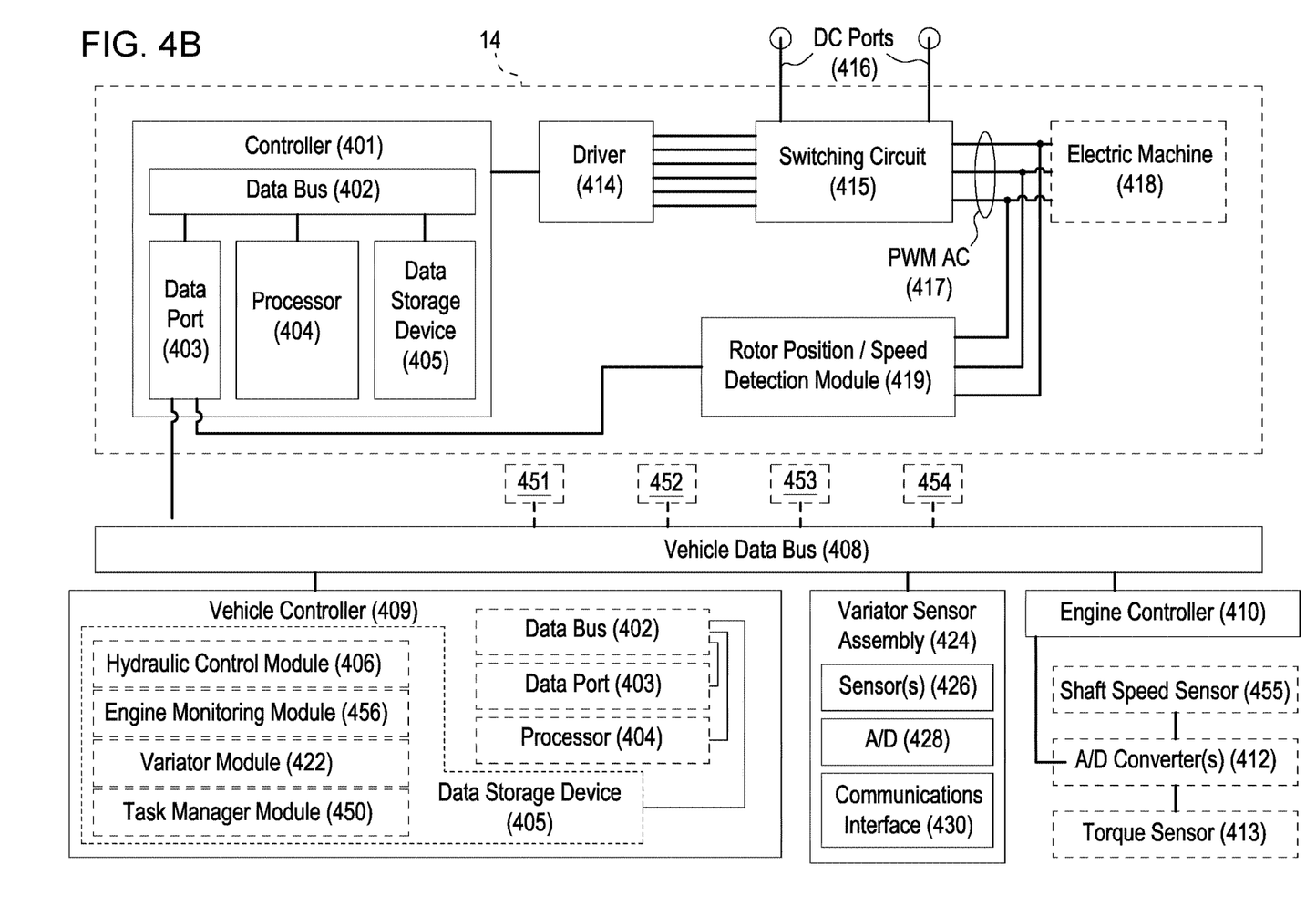
FIG. 4B is a block diagram of an inverter and a vehicle electronics system for a ground vehicle in greater detail than FIG. 4A.

In one embodiment in FIG. 4B, the vehicle controller 409 comprises an electronic data processor 404, a data storage device 405 and a data port 403 that are coupled to a data bus 402. The electronic data processor 404, the data storage device 405, and the data port 403 may communicate with each other via the data bus 402.

Further, in one illustrative configuration the vehicle controller 409 may comprise one or more of the following modules: a hydraulic control module 406, an engine monitoring module 456, a variator module 422, and a load manager module or task manager module 450. The foregoing modules may be optional because they are indicated in dashed lines in FIG. 4A and in FIG. 4B. Each module may comprise software, electronic hardware, or both. The software may comprise software instructions, modules, libraries, data files or other data structures that are stored in the data storage device 405 (of vehicle controller 409 in FIG. 4B) for execution, retrieval, or processing by the electronic data processor 404 or another controller.

In an alternate configuration, the software can be realized or modeled as electronic hardware in accordance with Boolean logic, equivalent circuits, digital or analog circuits, or the like. In one configuration, the task manager module 450 comprises any of the following: a task identifier, a task classifier, a load manager, and/or a load estimator for an implement, an actuator, or system of a work vehicle.

In one embodiment, the hydraulic control module 406 may estimate a hydraulic load of one or more of the following for one or more sampling intervals or a work session of the work vehicle: current hydraulic load of one or more hydraulic systems 22, current hydraulic load associated with one or more hydraulic pumps 20, a hydraulic output curve (e.g., expressed as an equation, a data set, historic measurements, pump manufacturer specifications or other data structure) associated with one or more hydraulic pumps, and current hydraulic load associated with one or more actuators or hydraulic cylinders of the implements of the work vehicle. The vehicle controller 409, the hydraulic control module 406 or the task manager module 450, alone or collectively, determine, generate or provide an appropriate commanded torque or commanded speed to be communicated to the second inverter 14 and its controller 401. According, the vehicle controller 409 or the task manager module 450 comprises an algorithm, a module or software instructions to keep the rotor speed of the electric machine (418, 12, 16, 32, 112, 116, 132) in the target operating point or region of the hydraulic pump 20 (which is independent of the engine shaft speed in the first mode), among other things.

A task manager module 450 of the vehicle controller 409 allows the target operating point or region of the hydraulic pump 20 to be shifted or to be aligned with the particular operational task that the vehicle (e.g., loader, excavator or other work vehicle) is engaged in. In one embodiment, the task manager module 450 or vehicle controller 409 to identifies a current task for a work session (or for one or more sampling intervals) from a set of potential task classifications, such as the rise/run task, a digging task, or another defined task, where each task is associated with corresponding implement load level or hydraulic system load level (e.g. intensity level). Further, the task manager module 450 may process, express, rank or categorize the hydraulic load level as a mode, median, average, mean hydraulic load level based on historic measurements for the worksite, work vehicle or for a fleet or group of work vehicles at a worksite.

In one embodiment, the vehicle controller 409 or task manager module 450 determines or estimates that each task may be associated with any combination of the following task parameters: reference duration, reference hydraulic flow rate, reference hydraulic pressure, reference load or mass associated with implement tool, reference height differential or height increase of the implement tool, vehicle acceleration, vehicle speed or velocity. In one configuration, the vehicle controller 409 or task manager module 450 identifies or classifies an observed task of the vehicle for one or more corresponding time intervals based on various sensor measurements (as described in this disclosure) or observations that are indicative of the above task parameters or reference task parameters. Further, the vehicle controller 409 or task manager module 450 may apply a corresponding target operating point or target operational region of the hydraulic pump 20, such as pump shaft rotational speed associated with the identified or classified task for one or more respective time intervals; hence, ultimately output the proper commanded rotor speed for the second inverter 14 to control precisely the rotor speed of the third electric machine 16 or motor that drives the hydraulic pump 20, independently of the engine shaft speed of the internal combustion engine 10 (e.g., in a first mode of operation).

In one embodiment, the commanded rotor speed (for the second inverter 14 to apply to the third electric machine 16 that drives the hydraulic pump 20 via the second variator 18) is associated with a corresponding target operating point (or target operating region 504 of the hydraulic pump 20) and the classified or identified task (or its associated load) for one or more respective sampling intervals or a work session for a corresponding worksite. The commanded rotor speed may be stored in look-up table, in an inverted file, a database or another data structure.

In one configuration, the vehicle controller or task manager module 450 receive sensor data from sensors coupled to the vehicle data bus 408 to estimate: (a) the pump shaft or pump rotor speed of the hydraulic pump 20, (b) a rotor position speed of the third electric machine 16, and (c) sensor data from the rotor position/speed detection module 419 or the inverter 14. For example, the rotor position/speed detection module 419 or the inverter 14 measures the current and/or voltage measurements at the alternating current (AC) terminals (417, 81, 83) between the second inverter 14 output and the third electric machine 16.

In an alternate embodiment, an optional hydraulic pump rotor speed sensor is coupled to the vehicle data bus 408 to provide feedback of the pump shaft rotational speed for the vehicle controller 409, the inverter controller 401, or both.

In certain configurations, the vehicle controller 409 or variator module 422 uses the gear ratio or effective gear ratio of the second variator 18 to estimate the pump rotor speed (e.g., gear rotational speed or displacement) or pump shaft speed, impeller rotational speed of the hydraulic pump 20, which may impact the estimation of the hydraulic load for one or more sampling intervals. Further, the variator module 422, alone or together with a transmission controller on the vehicle data bus 408, may track the coupling or decoupling between or among the rotatable interfaces, such as input/output shafts (56, 58, 60, 62, 63, 64, 67, 70) of the first variator 18, the second variator 26, and the primary gearbox 42 to facilitate proper control and supervision of the vehicle controller 409 for various modes of operation.

A task load may comprise a hydraulic load of a hydraulic pump 20 or hydraulic system 22 of an implement engaged in one or more of the following tasks, which can be executed separately or together. Under a first task load, the vehicle engages in a rise/run operation in which the load has a hydraulic implement load component (e.g., rise component) for moving/raising the implement with respect to ground and traction drive load component (e.g., run component) from moving the vehicle with respect to ground. Under a second task load, a rise/run operation comprises raising a reference point on the implement from a first height to and second height, with a zero mass load or a reference mass load, and accelerating the vehicle along a path from a first position (e.g., two or three dimensional coordinates) to a second position. Under a third task load, the rise/run operation relates to an implement that comprises an arm, a hydraulic boom system 50, and hydraulic bucket system 52 of a loader, an excavator, or another work vehicle. Under a fourth task load, the rise/run operation relates to an implement that comprises an arm or hydraulic bucket system 52 or fork of a loader. Under a fifth task load, the rise/run operation requires a minimum rotational speed of hydraulic pump 20 of the vehicle or a requisite operational range of rotational speed that is defined by a lower rotational speed limit, an upper rotational speed limit, or both. Under a sixth task load, the rise/run operation requires a first minimum rotational speed (e.g., approximately 1600 rpm) or first rotational speed range (e.g., approximately 1400 rpm to 1800 rpm) of the hydraulic pump 20 of the vehicle, whereas the transmission 24 for ground propulsion requires a second minimum rotational speed (e.g., approximately 1100 rpm) or second rotational speed range (e.g., approximately 1000 rpm to 1200 rpm) of the hydraulic pump 20, wherein the first minimum rotational speed is greater than the second minimum rotational speed. Under a seventh task load, the vehicle comprises a loader that is digging into a pile of material that demands that internal combustion engine 10 operate at or near a peak torque corresponding to respective engine shaft speed, unless the engine 10 operates a lower engine shaft speed below the peak torque with supplemental torque provided by the first inverter 34 controlling the first electric machine 12. Under an eighth task load, the vehicle is braked and the first electric machine 12 and the second electric machine 32 operate in a generating mode to oppose the movement of the vehicle along the ground via the traction drivetrain 30 and to generate alternating current (AC) electrical energy for application to the first inverter 34, which in turn rectifies the AC into DC for application to the energy storage device 36.

FIG. 5 is a chart or graph of hydraulic pump output 501 expressed as head 508 versus flow rate 510 for a hydraulic pump 20 of a hydraulic system 22 of a ground work vehicle. In FIG. 5, the vertical axis indicates the head 508, whereas the horizontal axis indicates the flow rate 510 of the hydraulic pump 20 that is output at the discharge of the hydraulic pump 20. In one illustrative example, the head 508 can be measured in meters; the flow rate 510 can be measured in liters per minute or liters per second. Although other pump output curves 506 are possible and fall within the scope of the appended claims, FIG. 5 provides one illustrative example of the pump output curve 506 of the hydraulic pump 20 as a solid curved line. Similarly, a hypothetical or illustrative hydraulic system load 502 for the implement system of a work vehicle may be represented by the dashed line, which may depend upon the work tasks in which the vehicle is engaged for a work session or one or more sampling intervals.

The target operating point 505 may lie at the intersection of the hydraulic system load curve 502 and the pump output curve 506 or at another point on the pump output curve 506 of the hydraulic pump 20. The rotational velocity of the pump shaft or pump rotor can be varied to fall within the target operating region 504, which is illustrated by the area or region with the cross-hatched lines that is generally below the pump output curve 506.

In an alternate embodiment, the pump output curve 506 represents the aggregate pump output of multiple hydraulic pumps that form part of a series, or parallel, hydraulic circuit, or hydraulic network, for instance.

The energy management system is well suited for support of mechanical decoupling between the hydraulic pump and the engine to support greater efficiency of the hydraulic pump and engine efficiency. For example, the energy management system can align the pump shaft rotational speed to operate at a target operation point or target operational region associated the head versus flow rate characteristics of the hydraulic pump, alone or together with an observed load of the hydraulic system that may be associated with or correlated with an estimated, identified, or classified task of the vehicle for one or more sampling intervals or work site sessions.

Advantageously, the independence of the hydraulic pump and hydraulic performance from the engine power, or its torque and shaft speed curve or characteristics, supports the potential for configuring a work vehicle with a smaller engine than otherwise possible to perform the same work with the implement that is supported at a target/static level of service by a robust electrically driven hydraulic system. Rather than downsize the engine, the energy management system supports operation of the engine with reduced fuel consumption and/or changes to fuel metering or fuel injection settings that may reduce power of the engine, but that maintain a target emissions profile or target emissions reduction strategy. In other configurations, the energy management system may support elimination/reduction of turbocharging or supercharging of the air intake or intake manifold pressure because the effective power of the engine may be reduced, while still fully supporting the independent robust electrically driven hydraulic system. The elimination, reduction, disabling or selective limited enabling of turbocharging or supercharging may reduce the cost of engine systems or improve longevity or reliability of the engine system under some circumstances.

In certain configurations, the optional on-board charger or power supply that is integral with the first inverter may promote reduced emissions by reducing the need to run the engine to charge the energy storage device via the first electric machine (e.g., generator), for example.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. An energy management system for a ground vehicle, the energy management system comprising:
    an internal combustion engine for providing a primary rotational energy via an engine shaft;
    a motor or electric machine configured to receive a portion of the primary rotational energy or to provide secondary rotational energy;
    an inverter is configured to control a rotor of the electric machine;
    a hydraulic pump for supplying hydraulic fluid to a hydraulic system load;
    a rotatable pump shaft or pump rotor of the hydraulic pump being coupled or decoupled selectively to the engine shaft, the rotor, or both for receipt of at least a portion of the primary rotational energy, the secondary rotational energy, or both;
    a vehicle controller configured to establish a commanded rotor speed for the motor or the electric machine based on a target pump shaft rotational speed for operation of the hydraulic pump at a set point or within an operational region consistent with the hydraulic system load or estimated work task of the vehicle for one or more sampling intervals, where the set point or operational region is defined by a hydraulic pump flow rate versus head characterization curve and where the target rotational speed of the pump shaft or pump rotor can be independent of a rotational speed of the engine shaft in a first mode.

2. The energy management system according to claim 1 wherein the target rotational speed of the pump shaft or pump rotor is generally independent of the power output of the internal combustion engine in the first mode.

3. The energy management system according to claim 1 wherein a variator is coupled between the hydraulic pump rotor and the electric machine such that the pump rotor or pump shaft is rotationally, mechanically coupled to the rotor of the electric machine.

4. The energy management system according to claim 1 wherein a variator is coupled between the internal combustion engine and the hydraulic pump such that the pump rotor or pump shaft is rotationally, mechanically coupled to the engine shaft in a second mode.

5. The energy management system according to claim 4 wherein a primary gearbox is coupled between the internal combustion engine and the variator such that the engine shaft is coupled to an input shaft of the variator to contribute primary rotational energy to the hydraulic pump.

6. The energy management system according to claim 1 further comprising a variator that intervenes between the hydraulic pump and the internal combustion engine and that intervenes between the hydraulic pump and the electric machine; a pump rotor or pump shaft being rotationally, mechanically coupled to the rotor of the electric machine and the pump rotor or pump shaft being rotationally, mechanically coupled to the engine shaft in a third mode or torque-assist mode in which the primary rotational energy and the secondary rotational energy are applied simultaneously to the pump rotor or pump shaft.

7. An energy management system for a ground vehicle, the energy management system comprising:
    an internal combustion engine for providing a primary rotational energy;
    a shaft assembly having an input shaft coupled to receive the primary rotational energy, the shaft assembly having a first output shaft and a second output shaft;
    a first electric machine configured to receive a portion of the primary rotational energy;
    a second electric machine configured to receive a portion of the primary rotational energy;
    a third electric machine configured to receive a portion of the primary rotational energy or to provide secondary electrical energy;
    a hydraulic system load coupled to the first output shaft for receipt of at least a first portion of the primary rotational energy or secondary electrical energy, a rotatable shaft of the hydraulic system coupled to the rotatable shaft of the third electric machine, the hydraulic system load comprising a hydraulic load of an implement of the vehicle;
    a dual inverter comprising primary alternating current (AC) terminals, secondary AC terminals, and DC terminals; the DC terminals coupled to the energy storage system, the primary AC terminals coupled to the generator and the secondary AC terminals coupled to the motor, the dual inverter generating motor command data for the motor in a torque control mode or speed control mode based on data messages of the vehicle controller; and
    a controller for providing the secondary rotational energy of the third electric machine to a hydraulic pump of the hydraulic system to rotate a pump shaft of the hydraulic pump with a hydraulic shaft speed that is at an operational set point or within an operational region of the hydraulic pump defined by the hydraulic pump flow rate versus head characterization curve.

8. The energy management system according to claim 7 wherein the inverter is configured to control the commanded rotor speed of the third electric machine in a motoring mode to operate the hydraulic pump at the operational set point or within the operational region, wherein the commanded rotor speed is independent of the engine speed of an engine shaft of the internal combustion engine.

9. The energy management system according to claim 8 wherein the engine size is decreased independently of the hydraulic load and the operational set point or operational region required for efficient operation of the hydraulic pump associated with a corresponding task load profile.

10. The energy management system according to claim 7 further comprising:
    an energy storage device;
    a first inverter coupled to the energy storage device;
    the second electric machine configured for control by the inverter, the second electric machine providing tertiary rotational energy to replace or supplement the primary rotational energy of the internal combustion engine.

11. The energy management system according to claim 10 wherein the engine size or engine output power of the internal combustion engine is decreased.

12. The energy management system according to claim 7 wherein the second electric machine has greater power capacity than the third electric machine.

13. The energy management system according to claim 7 further comprising:
the first inverter configured to convert auxiliary alternating current into direct current for charging the energy storage device if the vehicle is stationary or in a park mode and if the auxiliary alternating current is provided from a connection to an alternate current line of an alternating current grid or network.

14. The energy management system according to claim 7 further comprising:
the first inverter coupled to the first electric machine or the second electric machine, or both the first electric machine and the second electric machine in a motoring mode to supplement or replace the primary rotational energy of the internal combustion engine.

15. The energy management system according to claim 7 further comprising:
an electrically driven infinitely variable transmission or a first variator for receiving secondary rotational energy of the first electric machine, the second electric machine or both via input shafts of the electrically driven infinitely variable transmission in the motoring mode to supplement or replace the primary rotational energy with additional torque to prevent stall of the internal combustion engine during transient loads or transient traction drive loads.

16. The energy management system according to claim 7 further comprising:
an electrically driven infinitely variable transmission or a first variator for transmitting the primary rotational energy of the internal combustion engine to the first electric machine, the second electric machine or both via input shafts of the electrically driven infinitely variable transmission in the generating mode.

17. The energy management system according to claim 7 further comprising:
a traction drive load is associated with propulsion of the vehicle with respect to the ground;
a vehicle controller for simultaneously generating an alpha commanded speed command for the second inverter to apply to the third electric motor and for generating a beta commanded speed command for the first inverter to apply to the first electric machine or the second electric machine, wherein the alpha commanded speed command is different from the beta commanded speed command; wherein the alpha commanded speed command addresses the hydraulic load and wherein the beta speed command addresses the traction drive load simultaneously.

* * * * *